United States Patent
Aravind (10) Patent No.: US 7,984,495 B1
(45) Date of Patent: Jul. 19, 2011

(54) METHOD AND AN APPARATUS TO IDENTIFY SECURITY ASSOCIATION OF VIRTUAL PRIVATE NETWORK TUNNELS

(75) Inventor: Thangavelu Aravind, Dublin, CA (US)

(73) Assignee: Sonicwall, Inc., San Jose, CA (US)

( * ) Notice: Subject to any disclaimer, the term of this patent is extended or adjusted under 35 U.S.C. 154(b) by 1387 days.

(21) Appl. No.: 11/190,382

(22) Filed: Jul. 26, 2005

Related U.S. Application Data (60) Provisional application No. 60/660,255, filed on Mar. 9, 2005.

(51) Int. Cl.
- *G06F 9/00* (2006.01)
- *G06F 15/16* (2006.01)
- *G06F 17/00* (2006.01)

(52) U.S. Cl. ......................................................... 726/15

(58) Field of Classification Search ...................... 726/15
See application file for complete search history.

(56) References Cited

U.S. PATENT DOCUMENTS

| | | | |
|---|---|---|---|
| 6,711,159 B1 * | 3/2004 | Grabelsky et al. | 370/353 |
| 7,107,464 B2 * | 9/2006 | Shapira et al. | 726/15 |
| 2005/0097259 A1 * | 5/2005 | Zievers | 711/100 |
| 2005/0108464 A1 * | 5/2005 | Zievers | 711/100 |
| 2005/0111353 A1 * | 5/2005 | Zievers | 370/229 |

* cited by examiner

*Primary Examiner* — Kambiz Zand
*Assistant Examiner* — Stephen Sanders
(74) *Attorney, Agent, or Firm* — Blakely Sokoloff Taylor & Zafman, LLP

(57) ABSTRACT

A method and an apparatus to identify security association (SA) of virtual private network (VPN) tunnels are disclosed. In one embodiment, the method includes generating a free list having a first plurality of numbers, and randomizing the free list, wherein the first plurality of numbers in the randomized free list are possible candidates of a tunnel index for a security association (SA) of a virtual private network (VPN) tunnel between a first private network and a second private network during negotiation to establish the VPN tunnel, wherein the tunnel index is included in packets sent via the VPN tunnel. Other embodiments have been claimed and described.

34 Claims, 9 Drawing Sheets

METHOD AND AN APPARATUS TO IDENTIFY SECURITY ASSOCIATION OF VIRTUAL PRIVATE NETWORK TUNNELS

This application claims the benefit of U.S. Provisional Application No. 60/660,255, filed on Mar. 9, 2005.

TECHNICAL FIELD

Embodiments of the present invention relate to virtual private network (VPN), and more particularly, to identifying the security associations (SAs) of VPN tunnels.

BACKGROUND

Virtual private networks (VPN) typically involves an agreement between two private networks, separated by a public network (e.g., the Internet), to encode data packets, such as Internet Protocol (IP) packets, transmitted between them via the public network. The connection between the two private networks over the public network is often referred to as a VPN tunnel (also known as a VPN connection). A given private network may have multiple VPN tunnels to other networks. The configuration that determines what data is encoded and over what path the data is transmitted is referred to as a security association (SA) of the VPN tunnel on which that data is to be transmitted.

Since there can be multiple VPN tunnels established by different sending devices to a receiving device and each VPN tunnel may have a different SA, a unique tunnel index is assigned to each VPN tunnel in general. In particular, the SA is negotiated between a sending device in one of the two private networks and a receiving device in the other private network. Different VPN tunnels may or may not have the same SA. During the negotiation, the receiving device typically picks a random number to be a tunnel index, such as a security parameter index (SPI) to identify the SA of the VPN tunnel through which the data packets are transported; each data packet transmitted on a VPN tunnel, includes the SPI of that VPN tunnel. When a number of VPN tunnels have been established to send packets to a given device, that device may use the SPI in each data packet received to identify the corresponding SA for the data packet. Based on the SA identified, the receiving device may decode the data packet correctly.

Figure 1:
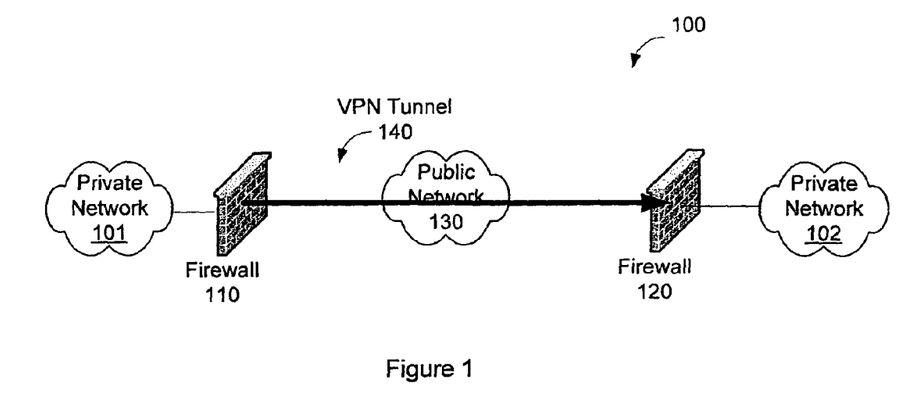
FIG. 1 illustrates a system usable with one embodiment of the invention.

FIG. 1 illustrates one conventional VPN system. The system 100 includes two private networks 101 and 102, two firewalls 110 and 120, and a VPN tunnel 140. The private network 101 is coupled to the firewall 110 such that the communication between devices (e.g., personal computers, servers, clients, Voice-over-Internet Protocol telephones, etc.) within the private network 101 and devices (e.g., personal computers, servers, clients, Voice-over-Internet Protocol telephones, firewalls, etc.) outside of the private network 101 goes through the firewall 110. Likewise, the private network 102 is coupled to the firewall 120 such that the communication between devices (e.g., personal computers, servers, clients, Voice-over-Internet Protocol telephones, etc.) within the VPN 102 and devices (e.g., personal computers, servers, clients, Voice-over-Internet Protocol telephones, firewalls, etc.) outside of the private network 102 goes through the firewall 120. The VPN tunnel 140 coupled the firewall 110 and the firewall 120 over a public network 130, such as the Internet.

Note that any or all of the components and the associated hardware illustrated in FIG. 1 may be used in various embodiments of the system 100. However, it should be appreciated that other configurations of the system 100 may include more, less, or different devices than those shown in FIG. 1.

Communication between the private networks 101 and 102 may not be secure because data packets (e.g., IP packets) are transmitted across the public network 130 to reach the other private network and the data packets may be intercepted by an unauthorized party over the Internet 130. Therefore, the VPN tunnel 140 is established between the firewalls 110 and 120 to provide a more secure medium for data packet transmission between the firewalls 110 and 120. In some embodiments, data packets entering the VPN tunnel 140 are encoded by the transmitting firewall and decoded by the receiving firewall. Note that the VPN tunnel 140 is bi-directional. Thus, the VPN tunnel 140 provides a secure way for the devices within the private networks 101 and 102 to communicate with each other over the public network 130.

While only one VPN tunnel 140 is shown in FIG. 1 to simplify the illustration, one should appreciate that there can be multiple VPN tunnels established between a given firewall (e.g., 110 or 120) and additional firewalls and/or devices, where these additional firewalls and/or devices may or may not be within the same private network. Therefore, a unique tunnel index is assigned to each VPN tunnel established. In particular, when the VPN tunnel 140 is established, the sending device in the sending private network (e.g., private network 101 or 102) may negotiate with the receiving device in the receiving private network (e.g., private network 102 or 101) to come up with the SA of the VPN tunnel 140. During the negotiation, the receiving device also selects a tunnel index to be included in every data packet transmitted via the VPN tunnel 140 to identify the SA of the VPN tunnel 140. The tunnel index selected may be a Security Parameter Index (SPI).

Using the tunnel index in a data packet received, the receiving firewall may identify the VPN tunnel 140 via which the data packet is transported, and hence, the SA associated with the VPN tunnel 140. Based on the SA, the receiving firewall and/or the receiving device in the receiving private network may decode the data packet received.

Currently, one way to look up a SA of a VPN tunnel is to perform a regular list walk of a list storing the tunnel indices and the SAs, such as the Security Association Database (SADB) list. One problem with this technique is that the list walk is not scalable. The SADB list walk has to be performed for every packet received. As the number of SAs grows in the order of thousands, the list walk may require walking through thousands of entries in the SADB before finding the correct SA. Thus, the list walk may become too time-consuming, and hence, slow down network traffic between the private networks.

SUMMARY

The present invention includes a method and an apparatus to identify security association of virtual private network tunnels. In one embodiment, the method includes generating a free list having a first plurality of numbers, and randomizing the free list, wherein the first plurality of numbers in the randomized free list are candidates of a tunnel index for a security association (SA) of a virtual private network (VPN) tunnel between a first private network and a second private network during negotiation to establish the VPN tunnel, wherein the tunnel index is included in packets sent via the VPN tunnel.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to identify security association (SA) of virtual private network (VPN) tunnels are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 2:
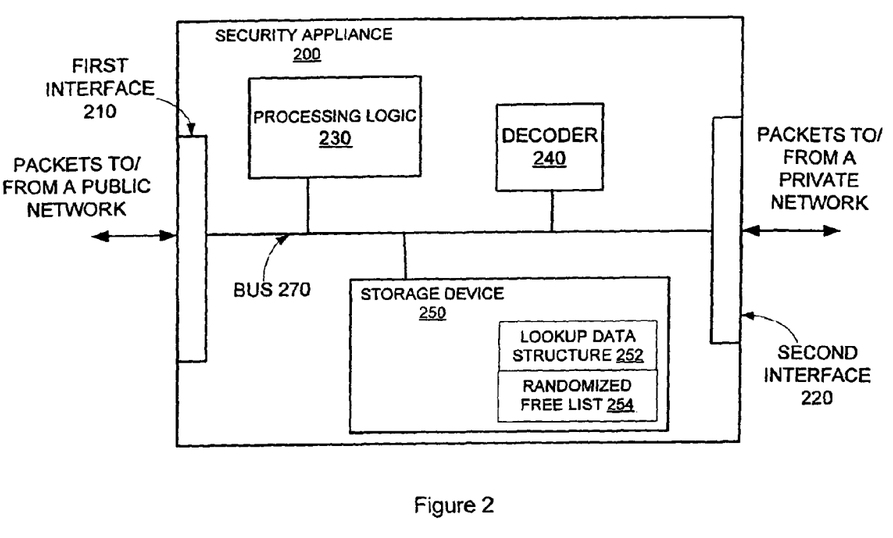
FIG. 2 illustrates one embodiment of a firewall.

FIG. 2 shows one embodiment of a security appliance, such as a firewall. The security appliance 200 includes a first interface 210, a second interface 220, processing logic 230, a decoder 240, a storage device 250, and a bus 270. The first interface 210, the second interface 220, the processing logic 230, the decoder 240, and the storage device 250 are coupled to each other via the bus 270. Note that different embodiments of the firewall 200 may include more, less, or different components than those shown in FIG. 2.

In one embodiment, processing logic 230 generates a free list of numbers or values, which are possible candidates of a tunnel index of a VPN tunnel to be established at the security appliance 200. Processing logic 230 may randomize the numbers in the free list and stored the randomized free list 254 in the storage device 250. When a VPN tunnel is established at the security appliance 200, processing logic 230 selects a number from the randomized free list 254. Processing logic 230 may use the selected number to build a tunnel index for the VPN tunnel in a variety of ways. Details of some examples of building the tunnel index using the selected number are discussed below.

In one embodiment, the first interface 210 receives data packets from a public network (e.g., the Internet) via a VPN tunnel. The data packets were encoded according to the SA of the VPN tunnel. Each of the data packets further includes a tunnel index. Processing logic 230 may identify the tunnel index in the data packet and may use the tunnel index to identify the SA of the VPN tunnel. In some embodiments, processing logic 230 finds the SA from a lookup data structure 252 stored in the storage device 250. More details of the lookup data structure 252 are provided below. Note that in some embodiments, the lookup data structure 252 and the randomized free list 254 are stored together in a combined data structure, such as a combined array. Details of one example of a combined data structure are described below with reference to FIG. 8. Based on the SA found, the decoder 240 may decode the data packet received. The second interface 220 may then forward the decoded data packet to one or more devices within the receiving VPN. More details of the identification of the tunnel index and the SA are described below with reference to FIGS. 3A-8.

Figure 3A:
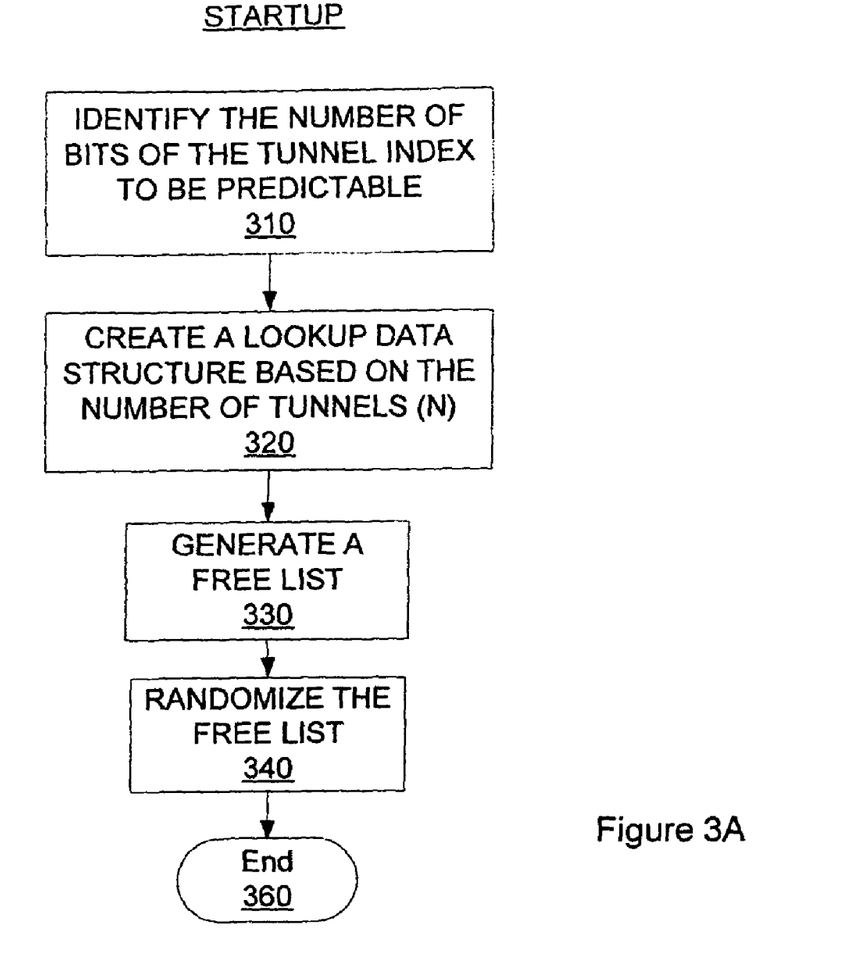
FIG. 3A illustrates a flow diagram of one embodiment of a process to prepare for establishing VPN tunnels.

FIG. 3A shows a flow diagram of one embodiment of a process to prepare for establishing VPN tunnels. The process is performed by processing logic that may comprise hardware (e.g., circuitry, dedicated logic, etc.), software (such as is run on a general-purpose computer system, a server, or a dedicated machine), or a combination of both.

As discussed above, VPN tunnels may or may not have the same SA. Thus, for a firewall supporting N VPN tunnels (e.g., 50, 300, 1000, etc.), there can be at most N different SAs. To identify the N different SAs, N distinct tunnel indices are used.

In one embodiment, the lookup speed is improved by using a subset of the SPI bits and using an ordered lookup structure (e.g., an array, a tree, etc.) representing all possible tunnel indices. Since using a subset of the SPI bits increases the chance that a randomly generated tunnel index will already be in used (thus, necessitating selection of another), a free list is used. However, since a normal free list will result in a pattern of tunnel indices being used that may compromise security (if a tunnel index can be predicted by another party), a randomized free list is used as described below.

Referring to FIG. 3A, processing logic identifies the set of bits of a tunnel index (e.g., the SPI field) to be used to distinguish tunnels, leaving any remaining bits of the tunnel index unused (where the unused bits may be randomly generated to make it more difficult for a third party to decipher the tunnel index) (processing block 310). The number of bits in this set (referred to as k) identifies the number of tunnels (N) with unique SAs that may be simultaneously supported ($N=2^k$). Then processing logic creates a lookup data structure based on the number of tunnels, N (processing block 320) (e.g., the ordered lookup data structure may include at least N slots and be ordered such that its search speed is bounded, such as an array, a tree, etc.). In the following discussion, it is assumed that the lookup data structure is an array having N slots to store N entries.

Processing logic generates a free list of values or numbers, which may be stored in the ordered lookup data structure created (processing block 330). Then processing logic randomizes the free list (processing block 340). In some embodiments, processing logic performs several operations to randomize the free list. The process ends (processing block 360).

Figure 3B:
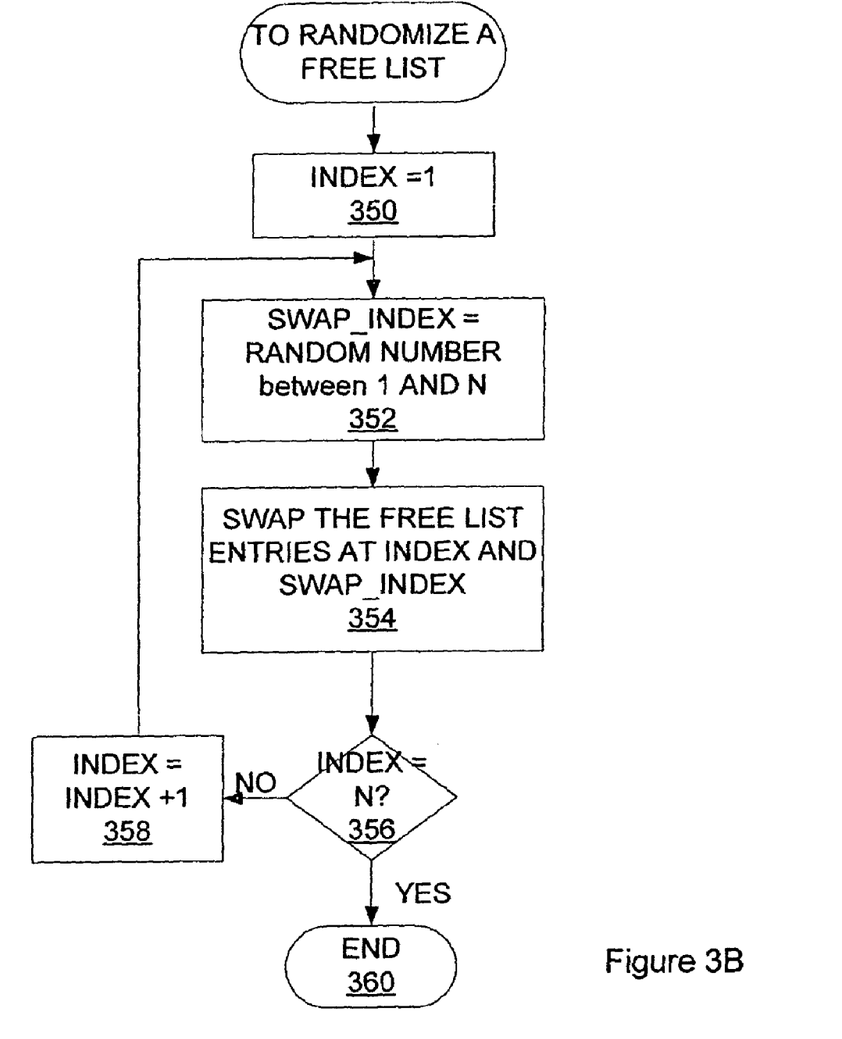
FIG. 3B illustrates a flow diagram of one embodiment of a process to randomize a free list.

While block 340 may be performed in a variety of ways, FIG. 3B illustrates one way to randomize the free list according to one embodiment of the invention. Referring to FIG. 3B, processing logic first sets index to be 1 (processing block 350). Then processing logic assigns a random number between 1 and N to be swap_index (processing block 352). Processing logic swaps the free list entries at index and swap_index (processing logic 354). Then processing logic checks whether index equals to N (processing block 356). If not, processing logic increments index by 1 (processing block 358) and repeats processing block 352. Otherwise, every entry in the free list has been processed and the free list has been randomized.

Figure 4:
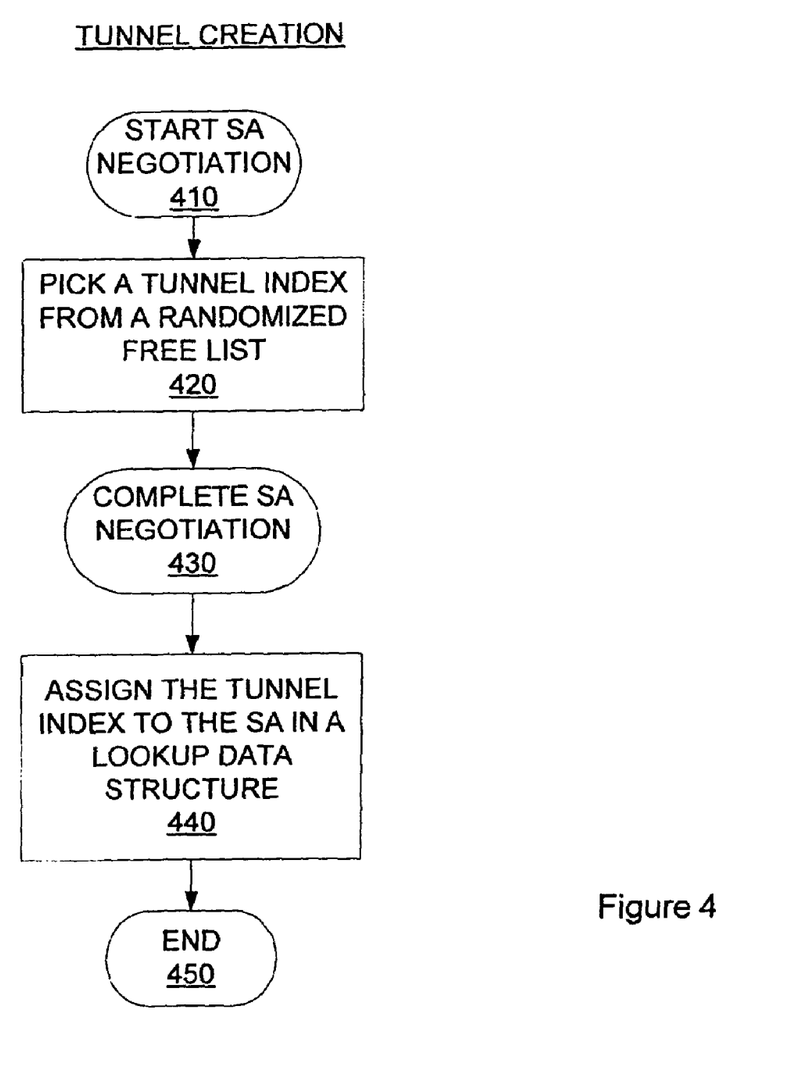
FIG. 4 illustrates a flow diagram of one embodiment of a process to create a VPN tunnel.

FIG. 4 shows a flow diagram of one embodiment of a process to create a VPN tunnel. The process is performed by processing logic that may comprise hardware (e.g., circuitry, dedicated logic, etc.), software (such as is run on a general-purpose computer system, a server, or a dedicated machine), or a combination of both.

Referring to FIG. 4, the process begins after a SA negotiation to establish a VPN tunnel has started between a sending device and a receiving device (processing block 410). Processing logic picks a number from a randomized free list of numbers (processing block 420) (the chosen number is removed from the free list). Details of how the randomized free list may be generated have been discussed above with reference to FIG. 3. Processing logic may use the number picked to build a tunnel index for the VPN tunnel. For instance, processing logic may append the number picked to a randomly generated number of a predetermined length. In some embodiments, processing logic simply uses the number picked as the tunnel index. After the SA negotiation is completed at processing block 430, processing logic assigns the tunnel index to the SA of the VPN tunnel to be established (processing block 440), where the chosen tunnel index is associated in the ordered search structure to the SA (e.g., with a pointer or other references). Then the process ends (processing block 450).

Figure 5:
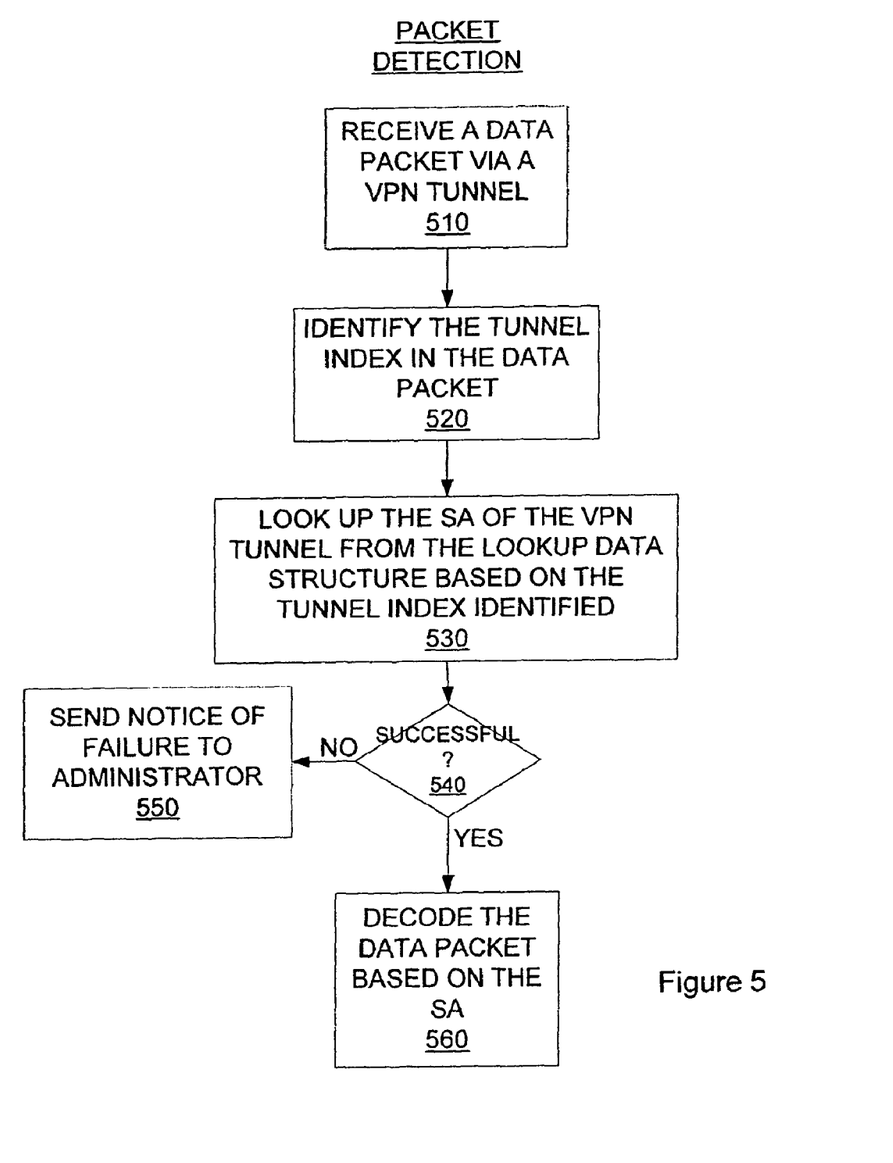
FIG. 5 illustrates a flow diagram of one embodiment of a process to handle a packet received via a VPN tunnel.

FIG. 5 illustrates a flow diagram of one embodiment of a process to handle a data packet received via a VPN tunnel. The process is performed by processing logic that may comprise hardware (e.g., circuitry, dedicated logic, etc.), software (such as is run on a general-purpose computer system, a server, a firewall, or a dedicated machine), or a combination of both.

Referring to FIG. 5, processing logic receives a data packet via a VPN tunnel (processing block 510). Then processing logic identifies a tunnel index in the data packet (processing block 520). The tunnel index may have been assigned to the SA of the VPN tunnel during negotiation to establish the VPN tunnel, details of which have been discussed above with reference to FIG. 4. Using the tunnel index identified, processing logic looks up the SA of the VPN tunnel from the ordered search structure (processing block 530).

For example, in some embodiments, in which the ordered lookup data structure includes an array, processing logic may store pointers to SAs of multiple VPN tunnels in the array. The size of the array may be equal to the maximum number of SAs supported, N. The array is hereinafter referred to as "sa_array." New entries are populated into sa_array after an SA is negotiated and removed from sa_array when an SA is deleted. To populate a new entry into sa_array, processing logic may get the tunnel index from the SA negotiated and then "AND" the tunnel index with a 1's complement of a predetermined mask, which may be referred to as a tunnel index mask. Then processing logic may save the pointer to the SA in a slot of sa_array having an index equal to the result of the AND operation. To remove an entry from sa_array when an SA is to be deleted, processing logic may get the tunnel index from the SA and then "AND" the tunnel index with the 1's complement of the predetermined mask. Then processing logic may store a NULL in the slot of sa_array having an index equal to the result of the AND operation, where the number or value replaced by NULL may be returned to the free list.

For incoming data packets, the tunnel index in each of the incoming data packets is used as an index to look up the SA pointer from sa_array. For example, processing logic may get the tunnel index in an incoming packet and then "AND" the tunnel index with the 1's complement of the predetermined mask. The result of the "AND" operation is the sa_array index of the corresponding SA pointer stored in sa_array. Using the SA pointer, processing logic can look up the SA.

One advantage of the SA lookup technique described above is that the time used to perform the above operations remains substantially constant even if the number of SAs supported increases. Unlike the conventional way to look up SAs, the above technique does not require walking through a list of tunnel indices whose size increases with the number of SAs supported. Since SA lookup is performed on every packet received via the VPN tunnels, the technique described above can achieve significant savings in time when the number of SAs supported is large.

Referring back to FIG. 5, processing logic may check whether the SA has been found successfully (processing block 540). If the SA has been found successfully, processing logic decodes the data packet based on the SA found (processing block 560). The decoded data packet may be forwarded to other device(s) within the receiving private network. However, if processing logic fails to find the SA using the tunnel index, the data packet may not be authorized to enter into the receiving private network. Thus, processing logic may send a predetermined message to the administrator of the system to notify the administrator of the situation (processing block 550).

Figure 6:
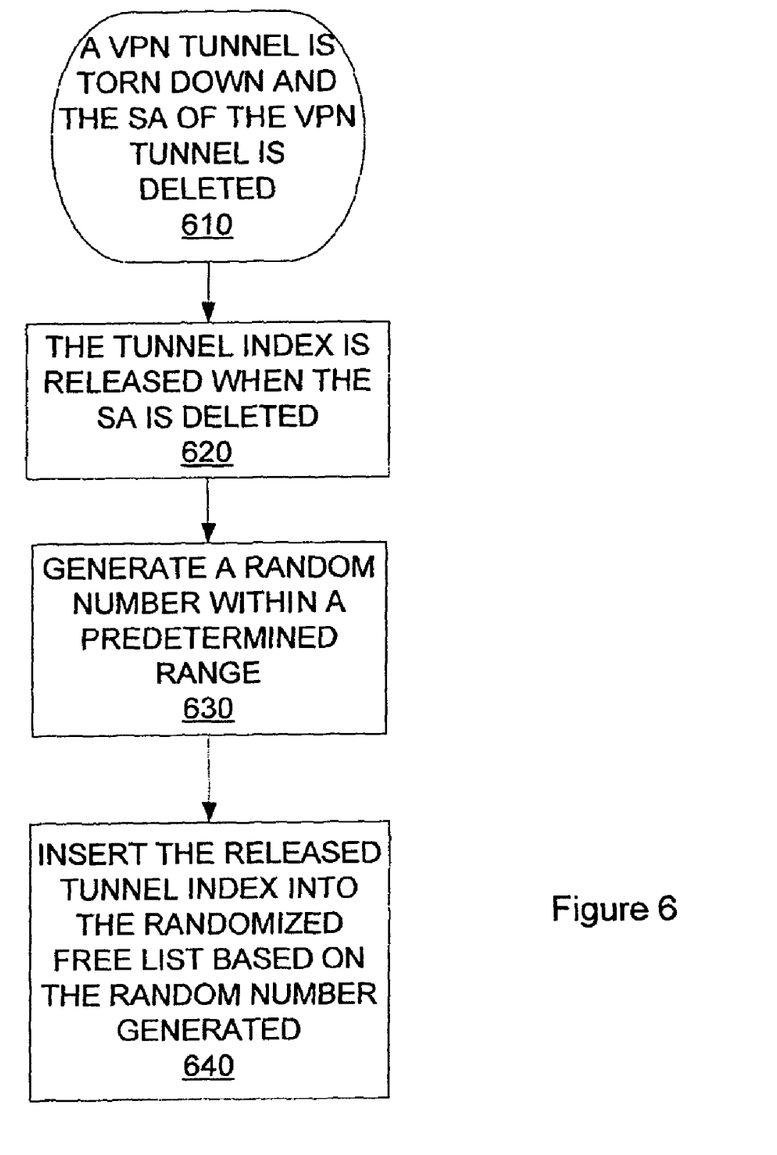
FIG. 6 illustrates a flow diagram of one embodiment of a process to reinsert a released tunnel index.

FIG. 6 illustrates a flow diagram of one embodiment of a process to reinsert a released tunnel index into a free list. The process is performed by processing logic that may comprise hardware (e.g., circuitry, dedicated logic, etc.), software (such as is run on a general-purpose computer system, a server, a firewall, or a dedicated machine), or a combination of both.

When a VPN tunnel between a given firewall and another firewall is torn down, the SA of the VPN tunnel is deleted at processing block 610, and thus, processing logic releases the tunnel index assigned to the deleted SA (processing block 620). Processing logic generates a random number within a predetermined range (processing block 630). For example, a random number between 1 and N may be generated, where N is the number of VPN tunnels supported by the given firewall. Based on the random number generated, processing logic inserts the released tunnel index back into the randomized free list, from which the tunnel index has been picked (processing block 640). Therefore, the randomness of the free list may be preserved. For example, the released tunnel index may be reinserted into the free list at a location having an index equal to the random number generated. As discussed above, the free list may be stored in a variety of data structure, such as an array, a tree, a linked list, etc.

Figure 7:
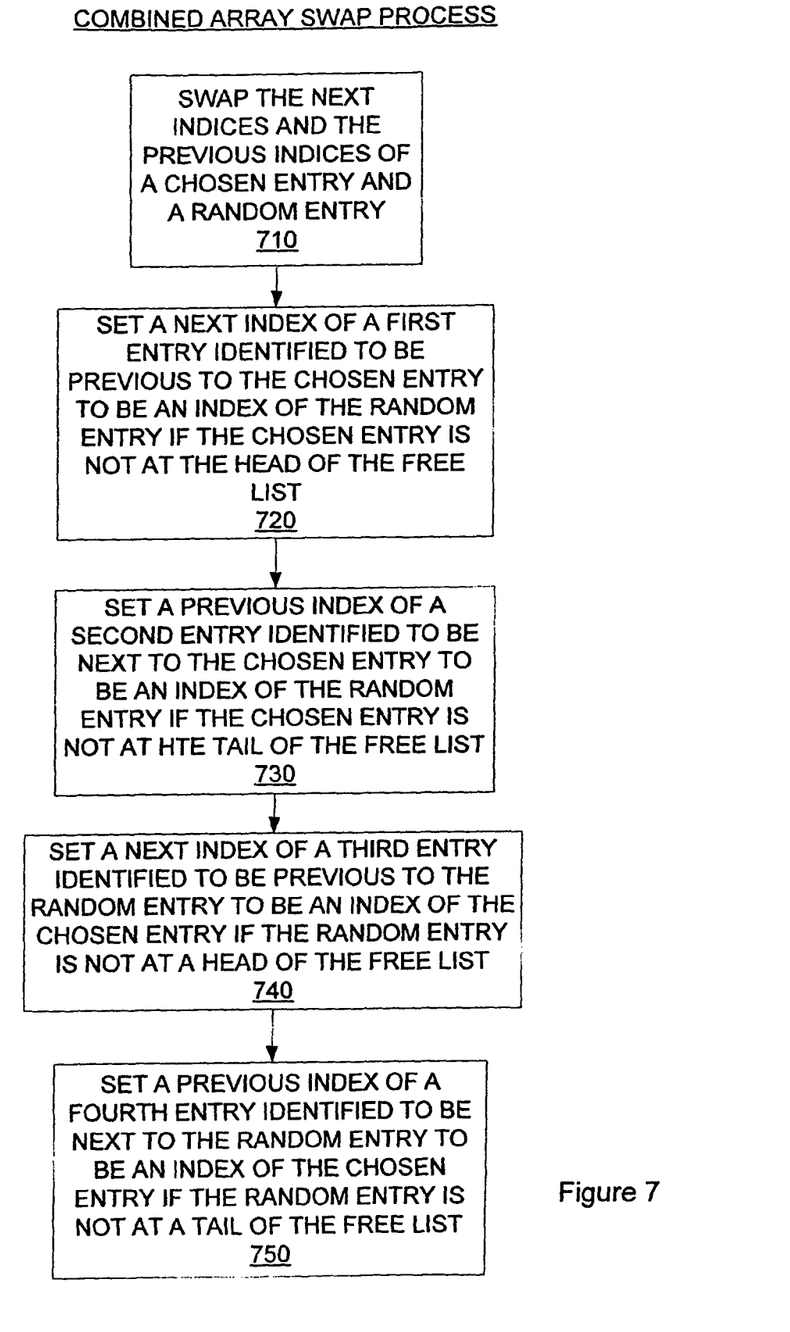
FIG. 7 illustrates a flow diagram of one embodiment of a process to swap a chosen entry and a random entry in a free list stored in a combined array.

FIG. 7 illustrates a flow diagram of one embodiment of a process to swap a chosen entry and a random entry in a free list stored in a combined array. In some embodiments, processing logic may perform this process to randomize a free list of entries before any VPN tunnel is established with a receiving firewall such that tunnel indices may be selected from the randomized free list. Furthermore, the process is performed by processing logic that may comprise hardware (e.g., circuitry, dedicated logic, etc.), software (such as is run on a general-purpose computer system, a server, or a dedicated machine), or a combination of both.

Figure 8:
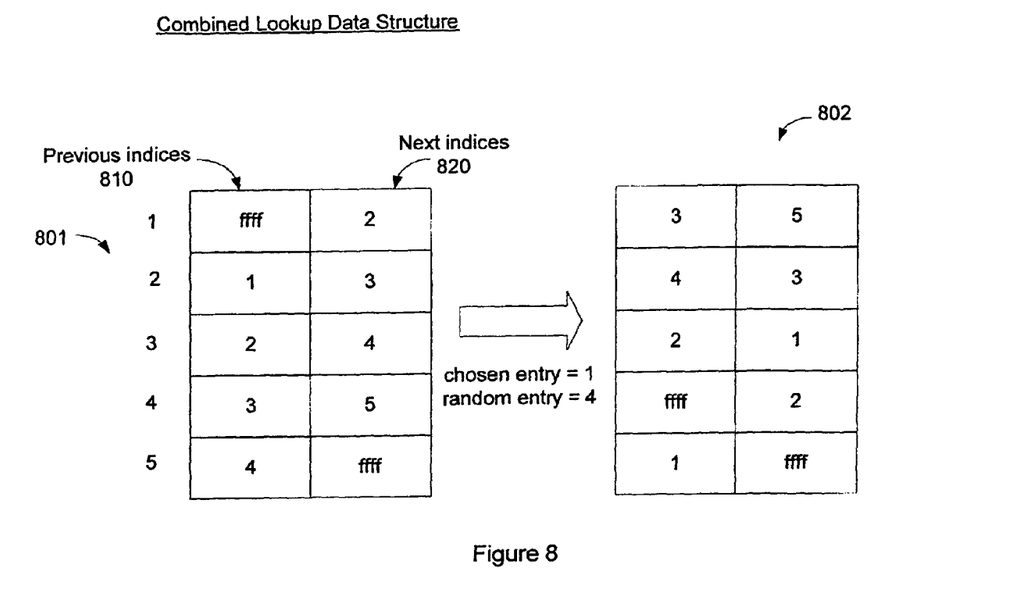
FIG. 8 illustrates an exemplary embodiment of a combined array.

In some embodiments, each entry in the free list has a previous index, a next index, and an index. The index of each entry indicates the order of the entry in the free list. The previous index indicates which entry is previous to the current entry in the free list, while the next index indicates which entry is next to the current entry in the free list. An exemplary embodiment of a data structure storing the indices of such a free list is illustrated in FIG. 8. Details of the example in FIG. 8 are described below.

Referring back to FIG. 7, processing logic swaps the next indices and the previous indices of the chosen entry and the random entry in the free list (processing block 710). Processing logic sets a next index of a first entry identified to be previous to the chosen entry to be an index of the random entry if the chosen entry is not at the head of the free list (processing block 720). Likewise, processing logic sets a previous index of a second entry identified to be next to the chosen entry to be an index of the random entry if the chosen entry is not at the tail of the free list (processing block 730).

For the random entry, processing logic sets a next index of a third entry identified to be previous to the random entry to be an index of the chosen entry if the random entry is not at a head of the free list (processing block 740). Likewise, processing logic sets a previous index of a fourth entry identified to be next to the random entry to be an index of the chosen entry if the random entry is not at a tail of the free list (processing block 750). The above technique uses a single array to store both the randomized free list and the selected tunnel indices. Thus, the use of memory in the receiving firewall may be optimized.

FIG. 8 illustrates the indices of an exemplary embodiment of a combined lookup data structure to store a free list. For each entry in the free list 801, an index is assigned to the entry. Furthermore, a previous index 810 and a next index 820 are stored in the array for each entry. The previous index 810 indicates which entry is previous to the current entry in the free list, while the next index 820 indicates which entry is next to the current entry in the free list. In some embodiments, a predetermined index or flag (e.g., ffff) is used to identify the head and the tail of the free list.

Initially, entries in the free list may be in order when the free list is generated. For example, the entries in the free list 801 are arranged in increasing order of the indices, with the head (i.e., entry 1) and the tail (i.e., entry 5) indicated by the predetermined index, ffff. To randomize the free list 801, one may go through each entry sequentially and swap the corresponding entry with a randomly picked entry in the free list 801. An example of the free list 802 after swapping entry 1 with a randomly picked entry is shown in FIG. 8.

As mentioned above, entry 1 is the chosen entry to be swapped with a randomly picked entry. In the current example, suppose the randomly picked entry is entry 4. To swap the two entries, the previous and the next indices of each of these two entries are swapped. Referring to FIG. 8, the indices 3 and 5 are swapped with the indices ffff and 2.

To complete the swapping, a next index of a first entry identified to be previous to the chosen entry to be an index of the random entry if the chosen entry is not at the head of the free list. However, since the chosen entry is at the head of the free list 801, no index of any entry in the free list 802 has to be modified. Next, a previous index of a second entry identified to be next to the chosen entry is set to be an index of the random entry if the chosen entry is not at the tail of the free list. In the current example, the entry identified to be next to the chosen entry (i.e., entry 1) is entry 2. Thus, the previous entry of entry 2 is changed from "1" to "4."

Likewise, a next index of a third entry identified to be previous to the random entry is set to be an index of the chosen entry if the random entry is not at a head of the free list. The entry identified to be previous to the random entry (i.e., entry 4) is entry 3. Thus, the next index of entry 3 is changed from "4" to "1." Finally, if the random entry is not at a tail of the free list, a previous index of a fourth entry identified to be next to the random entry is set to an index of the chosen entry. Since the random entry, entry 4, is not at a tail of the free list, the previous index of entry 5, which is identified to be next to entry 4, is changed from "4" to "1."

The process described above may be repeated for the remaining entries (i.e., entries 2-5) in the free list to randomize the free list. As described above, entries of the randomized free list may be picked to build tunnel indices assigned to the SAs of VPN tunnels. One advantage of using randomized tunnel indices is to improve the security of the VPN tunnels because it is more difficult to decipher which SA is associated with a randomly picked tunnel index.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a machine-accessible medium.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    generating, by processing logic running on a security appliance, a free list having a first plurality of numbers;
    the processing logic randomizing the free list, wherein the first plurality of numbers in the randomized free list are possible candidates of a tunnel index for a security association (SA) of a virtual private network (VPN) tunnel between a first private network and a second private network during negotiation to establish the VPN tunnel, wherein the tunnel index is included in packets sent via the VPN tunnel;

the processing logic selecting a number from the randomized free list to build the tunnel index;

the processing logic assigning the tunnel index built to the SA of the VPN tunnel;

the processing logic releasing the tunnel index when the SA is deleted; and the processing logic re-inserting the released tunnel index into the randomized free list such that randomness of the randomized free list is preserved, wherein said re-inserting comprises the processing logic generating a random number within a predetermined range, and the processing logic inserting the released tunnel index into the randomized free list based on the random number generated.

2. The method of claim 1, further comprising:

receiving, by an interface running on the security appliance, a packet via the VPN tunnel;

the processing logic identifying the tunnel index in the packet; and the processing logic looking up a security association (SA) using the tunnel index identified.

3. The method of claim 2, further comprising:

decoding, by a decoder running on the security appliance, the packet based on the SA if the SA has been successfully looked up.

4. The method of claim 2, further comprising:

if the SA has not been successfully looked up, the processing logic preventing the packet from entering the destined private network; and the processing logic sending a predetermined message to notify an administrator.

5. The method of claim 1, wherein the processing logic randomizing the free list comprises:

for each of the first plurality of numbers, the processing logic swapping the corresponding number with another number randomly picked from the free list.

6. The method of claim 5, further comprising:

the processing logic selecting a second plurality of numbers out of the first plurality of numbers; and the processing logic assigning each of the second plurality of numbers as a tunnel index to each of a plurality of VPN tunnels terminating at the second private network.

7. The method of claim 6, further comprising:

storing the second plurality of numbers and the associated SAs in a lookup data structure in a storage device in the security appliance.

8. The method of claim 7, further comprising storing the randomized free list in the lookup data structure in the storage device in the security appliance, wherein the processing logic randomizing the free list further comprises:

for each of the first plurality of numbers, the processing logic swapping next indices and previous indices of the corresponding number and the randomly picked number;

the processing logic setting a next index of a first number identified to be previous to the corresponding number to be an index of the randomly picked number if the corresponding number is not at a head of the free list;

the processing logic setting a previous index of a second number identified to be next to the corresponding number to be an index of the randomly picked number if the corresponding number is not at a tail of the free list;

the processing logic setting a next index of a third number identified to be previous to the randomly picked number to be an index of the corresponding number if the randomly picked number is not at a head of the free list; and the processing logic setting a previous index of a fourth number identified to be next to the randomly picked number to be an index of the corresponding number if the randomly picked number is not at a tail of the free list.

9. A machine-accessible medium that provides instructions that, if executed by a processor, will cause the processor to perform operations comprising:

generating a free list having a first plurality of numbers;

randomizing the free list, wherein the plurality of numbers in the randomized free list are possible candidates of a tunnel index for a security association (SA) of a virtual private network (VPN) tunnel between a first private network and a second private network during negotiation to establish the VPN tunnel, wherein the tunnel index is included in packets sent via the VPN tunnel;

selecting a number from the randomized free list to build the tunnel index;

assigning the tunnel index built to the SA of the VPN tunnel;

releasing the tunnel index when the SA is deleted; and re-inserting the released tunnel index into the randomized free list such that randomness of the randomized free list is preserved, wherein said re-inserting comprises generating a random number within a predetermined range, and inserting the released tunnel index into the randomized free list based on the random number generated.

10. The machine-accessible medium of claim 9, wherein the operations further comprises:

receiving a packet via the VPN tunnel;

identifying the tunnel index in the packet; and looking up a security association (SA) using the tunnel index identified.

11. The machine-accessible medium of claim 10, wherein the operations further comprises:

decoding the packet based on the SA if the SA has been successfully looked up.

12. The machine-accessible medium of claim 10, wherein the operations further comprises:

if the SA has not been successfully looked up, preventing the packet from entering the destined private network; and sending a predetermined message to notify an administrator.

13. The machine-accessible medium of claim 9, wherein randomizing the free list comprises:

for each of the first plurality of numbers, swapping the corresponding number with another number randomly picked from the free list.

14. The machine-accessible medium of claim 13, wherein the operations further comprise:

selecting a second plurality of numbers out of the first plurality of numbers; and assigning each of the second plurality of numbers as a tunnel index to each of a plurality of VPN tunnels terminating at the second private network.

15. The machine-accessible medium of claim 14, wherein the operations further comprise:

storing the second plurality of numbers and the associated SAs in a lookup data structure.

16. The machine-accessible medium of claim 15, wherein the operations further comprise storing the randomized free list in the lookup data structure, and wherein randomizing the free list further comprises:
for each of the first plurality of numbers,
swapping next indices and previous indices of the corresponding number and the randomly picked number;
setting a next index of a first number identified to be previous to the corresponding number to be an index of the randomly picked number if the corresponding number is not at a head of the free list;
setting a previous index of a second number identified to be next to the corresponding number to be an index of the randomly picked number if the corresponding number is not at a tail of the free list;
setting a next index of a third number identified to be previous to the randomly picked number to be an index of the corresponding number if the randomly picked number is not at a head of the free list; and
setting a previous index of a fourth number identified to be next to the randomly picked number to be an index of the corresponding number if the randomly picked number is not at a tail of the free list.

17. An apparatus comprising:
a storage device to store a free list having a first plurality of numbers; and
processing logic, coupled to the storage device, to randomize the free list, to select one of the plurality of numbers in the randomized free list to build a tunnel index, and to assign the tunnel index built to a security association (SA) of a virtual private network (VPN) tunnel during negotiation to establish the VPN tunnel, wherein the tunnel index is to be included in packets sent via the VPN tunnel, wherein the processing logic is further operable to release the tunnel index when the SA is deleted and to re-insert the released tunnel index into the randomized free list such that randomness of the randomized free list is preserved, wherein the processing logic is operable to re-insert the released tunnel index into the randomized free list by:
generating a random number within a predetermined range, and
inserting the released tunnel index into the randomized free list based on the random number generated.

18. The apparatus of claim 17, further comprising:
a first interface to be coupled to a VPN; and
a second interface to be coupled to one end of the VPN tunnel to receive the packets from the VPN tunnel, wherein the processing logic is operable to identify the tunnel index in the packets received and to identify a SA of the VPN tunnel using the tunnel index.

19. The apparatus of claim 18, further comprising:
a decoder to decode the packets received from the VPN tunnel based on the SA of the VPN tunnel.

20. The apparatus of claim 17, wherein the storage device is operable to store the randomized free list in a lookup data structure.

21. The apparatus of claim 20, wherein the storage device is operable to store a plurality of tunnel indices with the randomized free list in the lookup data structure.

22. A system comprising:
a first private network;
a virtual private network (VPN) tunnel to transport packets from a second private network to the first private network over a public network; and
a firewall coupled between the first private network and the VPN tunnel, the firewall comprising:
a storage device to store a free list having a first plurality of numbers; and
processing logic, coupled to the storage device, to randomize the free list, to select one of the plurality of numbers in the randomized free list to build a tunnel index, and to assign the tunnel index built to a security association (SA) of the VPN tunnel during negotiation to establish the VPN tunnel, wherein the tunnel index is to be included in packets sent via the VPN tunnel, wherein the processing logic is further operable to release the tunnel index when the SA is deleted and to re-insert the released tunnel index into the randomized free list such that randomness of the randomized free list is preserved, wherein the processing logic is operable to re-insert the released tunnel index into the randomized free list by:
generating a random number within a predetermined range, and
inserting the released tunnel index into the randomized free list based on the random number generated.

23. The system of claim 22, wherein the firewall further comprises:
a first interface to be coupled to the first private network; and
a second interface to be coupled to one end of the VPN tunnel to receive the packets from the VPN tunnel, wherein the processing logic is operable to identify the tunnel index in the packets received and to identify a SA of the VPN tunnel using the tunnel index.

24. The system of claim 23, wherein the firewall further comprises:
a decoder to decode the packets received from the VPN tunnel based on the SA of the VPN tunnel.

25. The system of claim 22, wherein the storage device is operable to store the randomized free list in a lookup data structure.

26. The system of claim 25, wherein the storage device is operable to store a plurality of tunnel indices with the randomized free list in the lookup data structure.

27. A method comprising:
selecting, by processing logic running on a security appliance, values from a randomized free list;
the processing logic building tunnel indices for different tunnels during their security association negotiation based on the values selected from the randomized free list;
the processing logic assigning the tunnel indices built to negotiated security associations of the tunnels;
the processing logic maintaining an association of which tunnel indices are currently assigned which tunnel's negotiated security association in an ordered lookup structure representing all possible tunnel indices; and
during tear down of each tunnel, the processing logic returning to the randomized free list, in a manner that keeps the randomized free list random, the value previously selected from the randomized free list for that tunnel's tunnel index, wherein said returning comprises the processing logic generating a random number within a predetermined range, and
the processing logic inserting the value previously selected into the randomized free list based on the random number generated.

28. The method of claim 27, wherein in the ordered lookup structure is a two-way, index-based linked list inside an array.

29. The method of claim 27, further comprising the preliminary steps of:
the processing logic determining the number of possible unique tunnel indices to be supported;
the processing logic creating the ordered lookup structure indexed by each of the determined possible tunnel indices;
the processing logic creating a free list of the determined possible tunnel indices; and
the processing logic randomizing the free list to generate the randomized free list.

30. The method of claim 27, further comprising:
for each data packet send over one of said tunnels, the processing logic including the tunnel index of that tunnel in the data packet; and
for each data packet received over one of said tunnels, the processing logic performing the following,
accessing the tunnel index from within the received data packet, and
determining the security association for the tunnel based on accessing the ordered lookup structure with the accessed tunnel index.

31. A machine-accessible medium that provides instructions that, if executed by a processor, will cause the processor to perform operations comprising:
selecting values from a randomized free list;
building tunnel indices for different tunnels during their security association negotiation based on the values selected from the randomized free list;
assigning the tunnel indices built to negotiated security associations of the tunnels;
maintaining an association of which tunnel indices are currently assigned which tunnel's negotiated security association in an ordered lookup structure representing all possible tunnel indices; and
during tear down of each tunnel, returning to the randomized free list, in a manner that keeps the randomized free list random, the value previously selected from the randomized free list for that tunnel's tunnel index, wherein said returning comprises
the processing logic generating a random number within a predetermined range, and
the processing logic inserting the value previously selected into the randomized free list based on the random number generated.

32. The machine-accessible medium of claim 31, wherein in the ordered lookup structure is a two-way, index-based linked list inside an array.

33. The machine-accessible medium of claim 31, wherein the operations further comprise:
determining the number of possible unique tunnel indices to be supported;
creating the ordered lookup structure indexed by each of the determined possible tunnel indices;
creating a free list of the determined possible tunnel indices; and
randomizing the free list to generate the randomized free list.

34. The machine-accessible medium of claim 31, wherein the operations further comprise:
for each data packet send over one of said tunnels, including the tunnel index of that tunnel in the data packet; and
for each data packet received over one of said tunnels, performing the following,
accessing the tunnel index from within the received data packet, and
determining the security association for the tunnel based on accessing the ordered lookup structure with the accessed tunnel index.

\* \* \* \* \*